(12) United States Patent
Keller

(10) Patent No.: US 9,644,143 B2
(45) Date of Patent: May 9, 2017

(54) WORKING MATERIAL FOR AN ABSORPTION COOLING MACHINE

(71) Applicant: THETFORD CORPORATION, Ann Arbor, MI (US)

(72) Inventor: Jürgen Keller, Siegen-Weidenau (DE)

(73) Assignee: THETFORD CORPORATION, Ann Arbor, MI (US)

( * ) Notice: Subject to any disclaimer, the term of this patent is extended or adjusted under 35 U.S.C. 154(b) by 402 days.

(21) Appl. No.: 14/026,191

(22) Filed: Sep. 13, 2013

(65) Prior Publication Data
US 2014/0091261 A1 Apr. 3, 2014

Related U.S. Application Data

(60) Provisional application No. 61/707,216, filed on Sep. 28, 2012.

(51) Int. Cl.
| | | |
|---|---|---|
| C09K 15/18 | (2006.01) | |
| C09K 15/02 | (2006.01) | |
| C09K 15/04 | (2006.01) | |
| C09K 5/04 | (2006.01) | |
| F25B 15/04 | (2006.01) | |
| F25B 15/10 | (2006.01) | |
| F25B 45/00 | (2006.01) | |

(52) U.S. Cl.
CPC .............. *C09K 15/18* (2013.01); *C09K 5/047* (2013.01); *C09K 15/02* (2013.01); *F25B 15/04* (2013.01); *F25B 15/10* (2013.01); *F25B 45/00* (2013.01); *Y02B 30/62* (2013.01); *Y02P 20/124* (2015.11)

(58) Field of Classification Search
CPC ........ C09K 15/02; C09K 15/18; C09K 5/047; Y02B 30/62; F25B 15/101; F25B 45/00; F25B 15/04; Y02P 20/124
See application file for complete search history.

(56) References Cited

U.S. PATENT DOCUMENTS

| | | | | | |
|---|---|---|---|---|---|
| 3,083,167 | A * | 3/1963 | Shannon | ................ | B01J 20/103 106/286.5 |
| 3,910,854 | A * | 10/1975 | Meyer | ...................... | C11D 7/02 106/14.11 |
| 4,037,650 | A * | 7/1977 | Randall | .................. | C09K 5/063 165/10 |
| 4,150,101 | A * | 4/1979 | Schmidt | .................. | C09C 1/309 423/335 |
| 5,077,020 | A * | 12/1991 | Lahoda | ............... | C22B 60/0278 423/1 |
| 5,725,793 | A * | 3/1998 | Keller | ..................... | C09K 5/047 252/69 |
| 2006/0151171 | A1* | 7/2006 | Davies | ................... | C09K 8/572 166/294 |
| 2010/0256347 | A1* | 10/2010 | Bublitz | .............. | B01D 53/1493 536/23.1 |
| 2010/0282083 | A1* | 11/2010 | Edwards | ............ | B01D 46/0028 95/285 |
| 2011/0162671 | A1* | 7/2011 | Gross | ..................... | A61K 8/463 132/208 |
| 2012/0078027 | A1* | 3/2012 | Dickinson | .......... | B01D 53/1493 585/854 |

FOREIGN PATENT DOCUMENTS

DE 19710082 A1 10/1998

\* cited by examiner

*Primary Examiner* — Joseph D Anthony
(74) *Attorney, Agent, or Firm* — Stephen T. Olson; Harness, Dickey & Pierce, P.L.C.

(57) ABSTRACT

Working material for absorption machines using ammonia ($NH_3$) or methylamine ($CH_3NH_2$) or dimethylamine (($CH_3$)$_2NH$) as the working agent and using water ($H_2O$) as the solvent, to which a small amount of basic water glass is added, i.e., a certain mixture of water glass and bases, which does not contain any chromium salts as corrosion inhibitors.

15 Claims, No Drawings

WORKING MATERIAL FOR AN ABSORPTION COOLING MACHINE

CROSS-REFERENCE TO RELATED APPLICATIONS

This application claims the benefit of U.S. Provisional Application No. 61/707,216, filed on Sep. 28, 2012. The entire disclosure of the above application is incorporated herein by reference.

FIELD

The present invention generally relates to working material systems for absorption cooling machines. The present invention also generally relates to working material for an absorption cooling machine that inhibits rust without using any chromium salts.

BACKGROUND

This section provides background information related to the present disclosure which is not necessarily prior art.

Working agents may be used in absorption machines, in particular absorption refrigerators, absorption heat pumps, absorption heat transformers and absorption-compression heat pumps and refrigerators of a single-stage or multistage design, with or without inert gas.

Reference is made to the following references for the state of the art in absorption machines, their working means and their use in refrigeration, climate control and heating technology: U.S. Pat. No. 5,725,793, Keller et al., issued Mar. 10, 1998; and German Patent No. DE19710082, issued Aug. 29, 2002, both of which are hereby incorporated by reference as if fully set forth herein.

While prior working agents for absorption machines may have proven to be acceptable for their intended purposes, a continuous need for improvement remains in the pertinent art. For example, it would be desirable to retain corrosion inhibiting qualities while removing chromium salts.

SUMMARY

This section provides a general summary of the disclosure, and is not a comprehensive disclosure of its full scope or all of its features.

An object of the present invention is to replace the chromium salts used up to now as corrosion inhibitors in the system of absorption working materials comprised of ammonia ($NH_3$) and water ($H_2O$).

An object of the invention is to replace the chromium salts, e.g., $Na_2CrO_4$ or $Na_2Cr_2O_7 \cdot 2H_2O$, which have so far been used as corrosion inhibitors in the absorption chemical agent system comprised of ammonia ($NH_3$) and water ($H_2O$) with substances that are not environmental pollutants. According to the EU Directive 2002/95/EC (ROHS Guideline), hexavalent chromium (Cr(VI)) falls under the heading of heavy metal ions that cause environmental pollution and whose use in electrical or electronic devices is not allowed according to Article 4 of the Guideline.

However, an exception is formulated in the Annex to the Guideline under No. 9 for household refrigerators and hotel refrigerators using absorber technology, in which chromium salts are allowed for use as corrosion inhibitors through Dec. 31, 2013. After that time, however, new findings about the further use of chromium salts will be required.

In accordance with one particular application, the present teachings provide a working material for absorption machines. The working material includes a working agent selected from the group consisting of ammonia ($NH_3$), methylamine ($CH_3NH_2$), and dimethylamine (($CH_3)_2NH$). Water ($H_2O$) is provided as a solvent. At least one base is provided, which is selected from the group consisting of a sodium hydroxide solution (NaOH), a potassium hydroxide solution (KOH), and a cesium oxide solution (CsOH). The working material additionally includes at least one water glass selected from the group consisting of sodium water glass having an aqueous solution of disodium oxide ($Na_2O$), 7-8% by weight, and silicon dioxide ($SiO_2$), 26-30% by weight; potassium water glass having an aqueous solution of dipotassium oxide ($K_2O$) with 12-14% by weight and silicon dioxide ($SiO_2$) with 22-28% by weight; and cesium water glass having an aqueous solution of dicesium oxide ($Cs_2O$), 18-28% by weight, and silicon dioxide ($SiO_2$), 20-26% by weight. A ratio of the weight of basic water glass to the weight of water is in a range of 0.5%<x<3%, where x=(weight of basic water glass)/(weight of water). A ratio of the weight of all the bases contained in the basic water glass to the weight of the total water glass is in the range of 0.1<y<10, where y=(weight of base)/(weight of water glass). The pH of pure water before being mixed with the basic water glass is at least 6. The pH of the solution of water and basic water glass is set in a range of approximately 10.5 to approximately 12.0 at 20° C.

Further areas of applicability will become apparent from the description provided herein. The description and specific examples in this summary are intended for purposes of illustration only and are not intended to limit the scope of the present disclosure.

DETAILED DESCRIPTION

Example embodiments will now be described more fully.

The present teachings provide a working material for an absorption machine that includes a working agent. The working agent may be selected from the group consisting of ammonia ($NH_3$), methylamine ($CH_3NH_2$), and dimethylamine (($CH_3)_2NH$). In various embodiments, the working agent is a vapor comprised of ammonium or methylamine or dimethylamine and contains less than 0.1% by weight water ($H_2O$) and less than 0.05% by weight silicon dioxide ($SiO_2$). Water ($H_2O$) is provided as a solvent.

The working material of the present teachings further includes at least one base. The at least one base may be selected from the group consisting of a sodium hydroxide solution (NaOH), a potassium hydroxide solution (KOH), and a cesium oxide solution (CsOH).

The working material of the present teachings additionally includes at least one water glass selected from a group consisting of sodium water glass having an aqueous solution of disodium oxide ($Na_2O$), 7-8% by weight, and silicon dioxide ($SiO_2$), 26-30% by weight; potassium water glass having an aqueous solution of dipotassium oxide ($K_2O$), 12-14% by weight, and silicon dioxide ($SiO_2$), 22-28% by weight; and cesium water glass having an aqueous solution of dicesium oxide ($Cs_2O$), 18-28% by weight, and silicon dioxide ($SiO_2$), 20-26% by weight. A ratio of the weight of basic water glass to the weight of water is in a range of 0.5%<x<3%, where x=(weight of basic water glass)/(weight of water). A ratio of the weight of all the bases contained in the basic water glass to the weight of the total water glass is in the range of 0.1<y<10, where y=(weight of base)/(weight of water glass). The pH of pure water before being mixed with the basic water glass is at least 6. The pH of the solution of water and basic water glass is set in a range of 10.5-12.0 at 20° C.

Heretofore, water glass, i.e. a mixture of at least one base and water glass, has been generally proposed as a substitute for chromium salts as corrosion inhibitors. In this regard, reference can be made to German Patent No. DE19710082, issued Aug. 29, 2002 which is hereby incorporated by reference as if fully set forth herein. The present teachings advance upon this technology.

The following information can be reported regarding the advancement of the present teachings:

a) The optimal composition of the basic water glass, i.e., the weight ratio $y$=(weight of base)/(weight of water glass)

may be in the range of $0.1<y<10$ for absorption machines which operate in the temperature range of (−35° C. to 200° C.).

b) The optimal dose of basic water glass in water as the solvent may be in the range of 0.5%-3% by weight.

c) Basic water glass has nearly no negative effect on the absorption process and in particular its efficiency, i.e., the ratio of refrigeration power on the evaporator to the heating power on the expeller of an absorption machine. This holds for short term and also long term operation.

In laboratory tests on six test machines of the Platen-Munters type with a maximum heating power of 125 W, it was found in the years 1999-2010 that adding basic water glass always improves the absorption process, as measured by the amount of ice formed on the evaporator pipe. This has been observed in both full load and partial load operation.

Furthermore, basic water glass also acts as a corrosion inhibitor: when several test units were opened after far more than 10 years of continuous operation under full load, no traces of corrosion at all were found in the units.

d) The corrosion-inhibiting effect of basic water glass according to the present teachings has not yet been fully elucidated electrochemically but in general it can be concluded that adding lye to water as the solvent definitely reduces the so-called water-based corrosion in metal containers and pipelines.

The water glass added acts as a chemical buffer and ensures that the pH of the solvent remains high, i.e., pH>11, even after many years of operation. Chemical analyses have also revealed that basic water glass is not consumed over a period of time in contrast with the traditional chromium salts in the solvent but instead is preserved. Water glass also seems to promote the formation of a thin inertizing protective layer consisting essentially of magnetite crystals ($Fe_3O_4$), but also silicon in the interior of the absorption equipment.

The current working materials can be used in absorption machines that include containers and pipelines made of carbonaceous steel. The carbonaceous steel can be selected from the group consisting of ST 34-2, ST 14-3, and ST 37-2. Additionally, the working materials can be used in air-sealed absorption machines without corrosion inhibitors, e.g., chromium salts ($Na_2CrO_4$ or $Na_2Cr_2O_7 \cdot 2H_2O$), with resorption or condensation, with or without a mechanical compressor, with or without inert gas filling, e.g., hydrogen ($H_2$), helium (He), or nitrogen ($N_2$), and with or without eddy tube depressurization technology. In various embodiments, the working materials can be used in household refrigerators and appliances, commercial refrigeration equipment and units, e.g. open freezer cases, industrial refrigeration plants, heat pumps, or heat transformers with or without utilization of waste heat.

As described above, the working material can be used for filling absorption machines. A method for filling absorption machines comprises evacuating an entire system after previously cleaning its interior; intaking the mixture of water and basic water glass as the solvent by suction; compressing the working agent ammonia ($NH_3$) or methylamine ($CH_3NH_2$) or dimethylamine (($CH_3$)$_2$NH), wherein the weight ratio of the working agent to the solvent is in the range of 25-50% by weight; and when using an inert gas for equalization of pressure between various parts of the system, compressing the inert gas (hydrogen ($H_2$), helium (He), nitrogen ($N_2$)) up to a total pressure in the range of 25-40 bar in the system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. Working material for absorption machines comprising:
a. a working agent selected from the group consisting of ammonia ($NH_3$), methylamine ($CH_3NH_2$), and dimethylamine (($CH_3$)$_2$NH);
b. water ($H_2O$) as a solvent;
c. at least one base selected from the group consisting of sodium hydroxide solution (NaOH), potassium hydroxide solution (KOH), and cesium oxide solution (CsOH); and
d. at least one water glass selected from the group consisting of sodium water glass having an aqueous solution of disodium oxide ($Na_2O$), 7-8% by weight, and silicon dioxide ($SiO_2$), 26-30% by weight; potassium water glass having an aqueous solution of dipotassium oxide ($K_2O$), 12-14% by weight, and silicon dioxide ($SiO_2$), 22-28% by weight; and cesium water glass having an aqueous solution of dicesium oxide ($Cs_2O$), 18-28% by weight, and silicon dioxide ($SiO_2$), 20-26% by weight,
wherein a ratio of the weight of the water glass to the weight of water is in a first range of $0.5\%<x<3\%$ where x=(weight of basic water glass)/(weight of water), a ratio of the weight of all the bases contained in the basic water glass to the weight of the total water glass is in a second range of $0.1<y<10$ where y=(weight of base)/(weight of water glass), the pH of pure water before being mixed with the basic water glass is at least 6, and the pH of the solution of water and basic water glass is set in a third range of approximately 10.5-12.0 at approximately 20° C.

2. The working material according to claim 1, wherein the working agent is a vapor selected from a group consisting of ammonium ($NH_3$) or methylamine ($CH_3NH_2$) or dimethylamine (($CH_3$)$_2$NH) and contains less than 0.1% by weight water ($H_2O$) and less than 0.05% by weight silicon dioxide ($SiO_2$).

3. An absorption machine using the working material according to claim 1, wherein the absorption machine includes containers and pipelines made of carbonaceous steel selected from the group consisting of ST 34-2, ST 14-3 and ST 37-2.

4. A method of using the working material according to claim 1, in air-sealed absorption machines without corrosion inhibitors, e.g., chromium salts ($Na_2CrO_4$ or $Na_2Cr_2O_7 \cdot 2H_2O$) with resorption or condensation, with or without a mechanical compressor, with or without inert gas filling, e.g., hydrogen ($H_2$), helium (He) or nitrogen ($N_2$) and with or without eddy tube depressurization technology; said method comprising introducing the working material into the absorption machines.

5. A method of using the working material according to claim 1, said method comprising introducing the working material into household refrigerators and appliances, commercial refrigeration equipment and units, e.g., open freezer cases, industrial refrigeration plants, heat pumps or heat transformers with or without utilization of waste heat.

6. A method for filling absorption machines having a working material according to claim 1, wherein the working material is introduced into the absorption machine in the following process steps:
   a. evacuating an entire system after previously cleaning its interior;
   b. intaking the mixture of water and basic water glass as the solvent by suction;
   c. compressing the working agent ammonia ($NH_3$) or methylamine ($CH_3NH_2$) or dimethylamine (($CH_3$)$_2NH$), wherein the weight ratio of the working agent to the solvent is in the range of 25-50% by weight; and
   d. when using an inert gas for equalization of pressure between various parts of the system, compressing the inert gas (hydrogen ($H_2$), helium (He), nitrogen ($N_2$)) up to a total pressure in the range of 25-40 bar in the system.

7. The working material according to claim 1, wherein the working agent is ammonia ($NH_3$).

8. The working material according to claim 1, wherein the working agent is methylamine ($CH_3NH_2$).

9. The working material according to claim 1, wherein the working agent is dimethylamine (($CH_3$)$_2NH$).

10. The working material according to claim 1, wherein the base is sodium hydroxide solution (NaOH).

11. The working material according to claim 1, wherein the base is potassium hydroxide solution (KOH).

12. The working material according to claim 1, wherein the base is cesium oxide solution (CsOH).

13. The working material according to claim 1, wherein the water glass is sodium water glass.

14. The working material according to claim 1, wherein the water glass is potassium water glass.

15. The working material according to claim 1, wherein the water glass is cesium water glass.

* * * * *